United States Patent
Rhoads et al.

(10) Patent No.: US 9,774,822 B2
(45) Date of Patent: Sep. 26, 2017

(54) METHOD AND APPARATUS FOR QAM MODULATOR CHANNEL DISTRIBUTION HAVING A PLURALITY OF MODES

(71) Applicants: Steven Charles Rhoads, Carmel, IN (US); Douglas Paul Strachota, Indianapolis, IN (US)

(72) Inventors: Steven Charles Rhoads, Carmel, IN (US); Douglas Paul Strachota, Indianapolis, IN (US)

(73) Assignee: THOMSON Licensing, Issy-les-Moulineaux (FR)

(*) Notice: Subject to any disclaimer, the term of this patent is extended or adjusted under 35 U.S.C. 154(b) by 0 days.

(21) Appl. No.: 14/394,498

(22) PCT Filed: Jul. 17, 2013

(86) PCT No.: PCT/US2013/050805
§ 371 (c)(1),
(2) Date: Oct. 15, 2014

(87) PCT Pub. No.: WO2014/014982
PCT Pub. Date: Jan. 23, 2014

(65) Prior Publication Data
US 2015/0052556 A1    Feb. 19, 2015

Related U.S. Application Data

(60) Provisional application No. 61/673,396, filed on Jul. 19, 2012.

(51) Int. Cl.
H04N 7/10 (2006.01)
H04H 20/63 (2008.01)
(Continued)

(52) U.S. Cl.
CPC ............ *H04N 7/106* (2013.01); *H04H 20/63* (2013.01); *H04N 5/40* (2013.01);
(Continued)

(58) Field of Classification Search
CPC ......... H04N 21/41415; H04N 21/2383; H04N 21/4383; H04N 21/482; H04N 21/6405;
(Continued)

(56) References Cited

U.S. PATENT DOCUMENTS

2002/0131443 A1*  9/2002  Robinett .......... H04N 21/23608
                                                       370/442
2005/0175008 A1   8/2005  Thompson
(Continued)

FOREIGN PATENT DOCUMENTS

EP      1002407      12/2005
WO      WO0211451    2/2002

OTHER PUBLICATIONS

Cinemar, Inc. Sports Bar Audio and Video Control Packages. [online], [retrieved on Jul. 22, 2016]. Retrieved from the Internet <URL: https://web.archive.org/web/20110202173049/http://www.cinemarsolutions.com/sportsbar.php>.*
(Continued)

*Primary Examiner* — Pankaj Kumar
*Assistant Examiner* — Alexander Boyd
(74) *Attorney, Agent, or Firm* — Brian J. Dorini; Jeffrey M. Navon

(57) ABSTRACT

Content distribution systems, methods and user interfaces are described wherein a modulator dynamically duplicates output of multiple channels, a plurality of receivers are individually tuned to one of the multiple channels, wherein a single transport stream can be sent on the multiple channels to each of the desired receivers and wherein the distribution can occur in multiple modes, and user interfaces
(Continued)

which allow a manager of the content distribution system to dynamically change the channels on each receiver so that each of the receivers can be tuned to one of the multiple channels through the user interface.

14 Claims, 10 Drawing Sheets

(51) Int. Cl.

| | | |
|---|---|---|
| H04N 21/214 | (2011.01) | |
| H04N 21/2383 | (2011.01) | |
| H04N 21/2385 | (2011.01) | |
| H04N 21/63 | (2011.01) | |
| H04N 5/40 | (2006.01) | |
| H04N 21/414 | (2011.01) | |
| H04N 21/43 | (2011.01) | |
| H04N 21/482 | (2011.01) | |
| H04N 21/6405 | (2011.01) | |
| H04N 21/438 | (2011.01) | |
| H04N 21/485 | (2011.01) | |
| H04N 21/436 | (2011.01) | |
| H04H 40/90 | (2008.01) | |

(52) U.S. Cl.
CPC ..... *H04N 21/2143* (2013.01); *H04N 21/2383* (2013.01); *H04N 21/2385* (2013.01); *H04N 21/41415* (2013.01); *H04N 21/4302* (2013.01); *H04N 21/4382* (2013.01); *H04N 21/4383* (2013.01); *H04N 21/43615* (2013.01); *H04N 21/482* (2013.01); *H04N 21/485* (2013.01); *H04N 21/631* (2013.01); *H04N 21/6405* (2013.01); *H04H 40/90* (2013.01)

(58) Field of Classification Search
CPC .. H04N 21/2143; H04N 21/485; H04N 7/106; H04N 5/40; H04N 21/2385; H04N 21/4302; H04N 21/43615; H04N 21/4382; H04N 21/631; H04H 20/63; H04H 40/90
See application file for complete search history.

(56) References Cited

U.S. PATENT DOCUMENTS

| | | | |
|---|---|---|---|
| 2006/0274208 A1* | 12/2006 | Pedlow, Jr. | H04N 21/235 348/572 |
| 2007/0079340 A1 | 4/2007 | McEnroe | |
| 2007/0220547 A1 | 9/2007 | Teskey | |
| 2008/0095155 A1 | 4/2008 | Danzig | |
| 2009/0298418 A1 | 12/2009 | Michael et al. | |
| 2010/0179864 A1* | 7/2010 | Feldman | G06Q 30/02 705/12 |
| 2010/0223392 A1* | 9/2010 | Pond | H04N 21/6405 709/231 |
| 2011/0271313 A1 | 11/2011 | Urban et al. | |
| 2012/0177066 A1* | 7/2012 | Spransy | H04N 21/23406 370/486 |
| 2013/0198796 A1* | 8/2013 | Brooks | H04N 21/2383 725/129 |
| 2013/0211567 A1* | 8/2013 | Oganesyan | H04W 4/20 700/94 |

OTHER PUBLICATIONS

Supplemental European Search Report for Corresponding EP Application No. EP13819198 Dated Nov. 23, 2015.

* cited by examiner

FIG. 5     230

FIG. 9

METHOD AND APPARATUS FOR QAM MODULATOR CHANNEL DISTRIBUTION HAVING A PLURALITY OF MODES

CROSS REFERENCE TO RELATED CASES

This application claims the benefit, under 35 U.S.C. §365 of International Application PCT/US13/050805, filed Jul. 17, 2013, which was published in accordance with PCT Article 21(2) on Jan. 23, 2014 in English and which claims the benefit of U.S. provisional patent application Ser. No. 61/673,396, entitled "Method and Apparatus for QAM Modulator Channel Distribution Having a Plurality of Modes", filed on Jul. 19, 2012 and is a continuation in part of Patent Cooperation Treaty Application serial number PCT/US12/054744, entitled "Method and Apparatus for QAM Modulator Channel Duplication", filed on Sep. 12, 2012, and is also a continuation in part of Patent Cooperation Treaty Application serial number PCT/US12/057166, entitled "User Interfaces for Content Distribution Systems", filed on Sep. 26, 2012.

REFERENCE TO A COMPUTER APPENDIX

A computer listing named Directune2.txt is provided as an ASCII file and is specifically incorporated herein by reference. This listing was created on Jun. 9, 2017 and was part of the application as originally filed. The Directune2.txt file is 37.7 Kilobytes (KB) in size.

FIELD OF THE INVENTION

The present invention relates to quadrature amplitude modulated (QAM) signals and the use of QAM modulators. More specifically, the present invention relates to user interfaces for use with the dynamic modification of QAM signals wherein multiple QAM channels can be sent to multiple video display devices with a single transport stream from a QAM modulator.

BACKGROUND OF THE INVENTION

There are many environments where multiple video display devices, for example televisions (TV) exist, but only one, or just a few receivers, are in place to send channel information to the TVs. Sports bars are a prime example of such an environment, but many others such examples are extant, especially when it is desired to send different channels or subchannels to different places in an environment, but to save cost, only a limited number of receivers are provided.

In the sports bar environment, for example, bartenders want to be able to control the content on each TV without having to use single or multiple TV remotes, since using a TV remote may cause adjacent TVs to also change channels. Using a remote in a sports bar thus now requires walking to each TV with a specific remote to change the channel, which may cause other nearby TVs to also change channels.

One such receiver, although there are many such receivers, which is often placed in a multiple TV environment such as a sports bar is the DirecTV® COM1000 content distribution system (designed and manufacture by TECHNICOLOR Inc., the owner of the present application and invention), which is a TV receiver system capable of tuning and transcrypting up to 24 TV channels and which tunes and demodulates a Motion Picture Entertainment Group (MPEG) standard MPEG-2 transport stream for further distribution in an environment through, for example, a QAM device or an internet protocol (IP) data distribution system, for example an IPTV system. The DirecTV® COM1000 is ideal for the multiple TV environment such as hotels, sports bars, and the like.

The DirecTV® COM1000 includes a QAM modulator card or board which receives the demodulated MPEG-2 transport stream for further distribution. The card is denoted a QAM24 modulator and it receives MPEG-2 transport packets from an Ethernet port and then QAM modulates the MPEG2 transport packets on one of twelve carrier frequencies. Each input stream results in one output QAM modulated channel (such as cable channel 50-1). However, nothing in the current content distribution systems allows individual receivers to play separate content on each TV without controlling the content with a separate remote for each TV.

It would be desirable to design a system which permits separate playing and control of content in a multiple TV environment without use of a remote control for each TV. Such needs have not heretofore been fulfilled in the art.

Moreover, currently there is no way in which a manager of such an environment, for example a Bartender in a sports bar or casino, can search for video content and see what channels are currently playing and to allow the content to change, be tracked and otherwise adjusted. It would therefore be desirable to provide a user interface to perform such tasks.

Still further, there is a need to address the issue of control of a multiple TV environment that is adaptable to a plurality of distribution configurations, including distribution using IP multicasts and addressable channel controllers. These needs as well have not heretofore been fulfilled in the art.

SUMMARY OF THE INVENTION

The content distribution system of the present invention allows multiple television programs and channels to be output to multiple TV sets in an environment, thereby eliminating the need for remote controls to be used to change channels and potentially interfere with neighboring TV sets. The present invention permits a modulator to dynamically duplicate the output of channels, thereby allowing multiple TV sets to be statically tuned to fixed channels. The modulator can then duplicate the output so that a single input MPEG-2 transport stream can be sent out on multiple channels and sub-channels to each of the desired TV sets.

Aspects of the invention further provide a user interface for a content distribution system that allows a manager of an environment of TV sets to view which content is playing on individual TV sets, and to change, track and otherwise adjust the content. The invention advantageously provides these features without interfering with other TV sets' programming when another TV set is being adjusted, changed or tracked by the manager.

Still further aspects of the invention provide additional operating modes that may be possible and may be used in conjunction with, or instead of, the mode described above. While the above mode focuses primarily on conventional RF signal transmission and using physical QAM channels to deliver media content, certain configurations of the signal distribution systems such as may be found in casinos or multi-room facilities may also benefit from other operating modes, including addressable control and Internet Protocol multicasting. In a second mode, the IP streams are controlled rather than the channels. And in a third mode, the TV channeling is addressable, allowing further channel mapping flexibility.

Such advantageous results are achieved and problems solved by methods and content distribution systems comprising a modulator for dynamically duplicating output of multiple channels, a plurality of receivers which each can be individually tuned to one of the multiple channels, wherein a single transport stream can be sent on the multiple channels to each of the desired receivers, and a user interface which allows a manager of the content distribution system to dynamically change the channels on each receiver with the user interface so that each of the receivers can be tuned to one of the multiple channels through the user interface.

The invention will be best understood when reading the following Detailed Description of Preferred Embodiments in conjunction with the accompanying drawings which are first described briefly below.

BRIEF DESCRIPTION OF THE DRAWINGS

Figure 9:
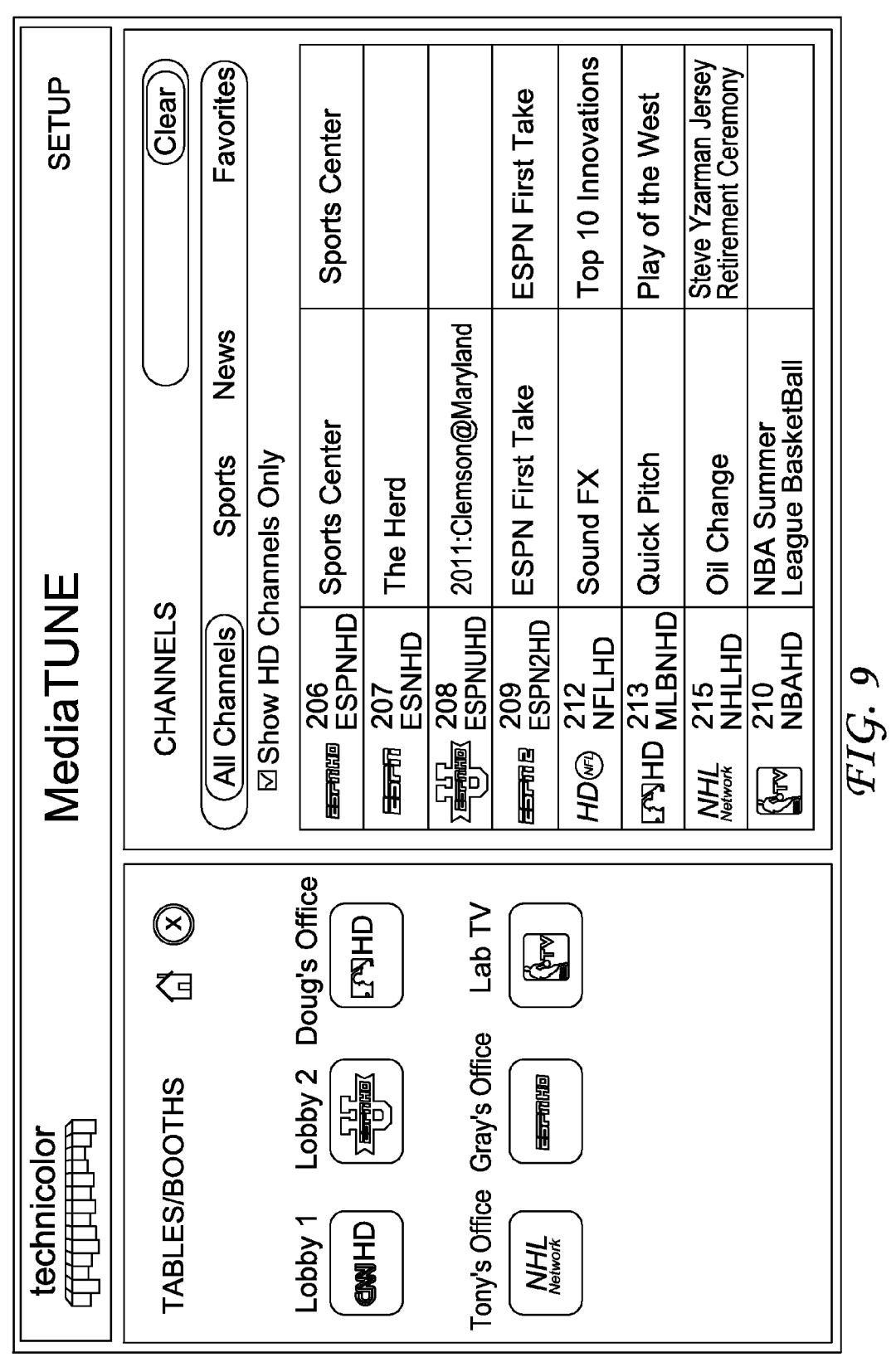

FIG. 9 illustrates a further preferred embodiment of the user interface of the present invention called "media tune" in which drag and drop functionality is provided.

DETAILED DESCRIPTION OF PREFERRED EMBODIMENTS

Figure 1:
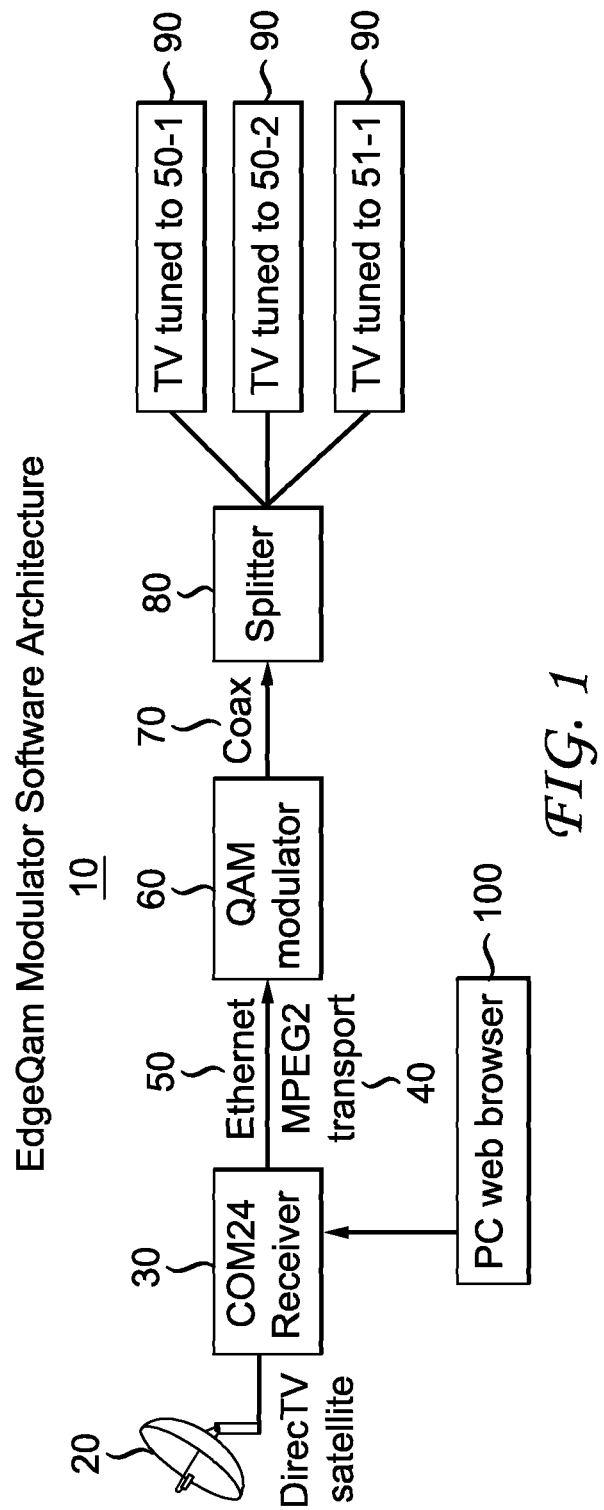
FIG. 1 is a block diagram of a media server architecture provided in accordance with the present invention.

Referring now to the Figures wherein like reference numerals refer to like elements, in FIG. 1 a preferred embodiment of a content distribution system according to the invention is shown at 10. A satellite downloads a signal which is input to a receiver 30 that demodulates the signal and produces an MPEG-2 transport stream 40 having packets, preferably UDP packets, containing data and video programming to be distributed to the environment. The MPEG-2 transport stream 40 is preferably transported by an Ethernet link 50 to a QAM modulator 60 which modulates the MPEG-2 transport stream 50 in accordance with principles of the present invention.

Preferably, the QAM modulator 60 modulates the MPEG-2 transport stream 40 on one of twelve carrier frequencies. Each input stream 40 results in an output QAM modulated channel which is output over a coax cable 70 and split with a splitter 80. In this fashion, the QAM modulator 60 permits dynamic duplication of output channels so that each TV 90 may be statically tuned to a fixed channel, for example, channels 50-1, 50-2, 503, etc., thereby eliminating the necessity for each channel to be individually tuned with a separate remote and allowing different programs to be played on different TV sets 90 without interference from other, nearby TV sets being tuned with a remote control to provide different desired programs. Optionally, a PC web browser 100 is provided interfaced to the receiver 30 to control the data programming necessary to accomplish these results and to provide other functionality to perform the functions of content distribution system 10.

Figure 2:
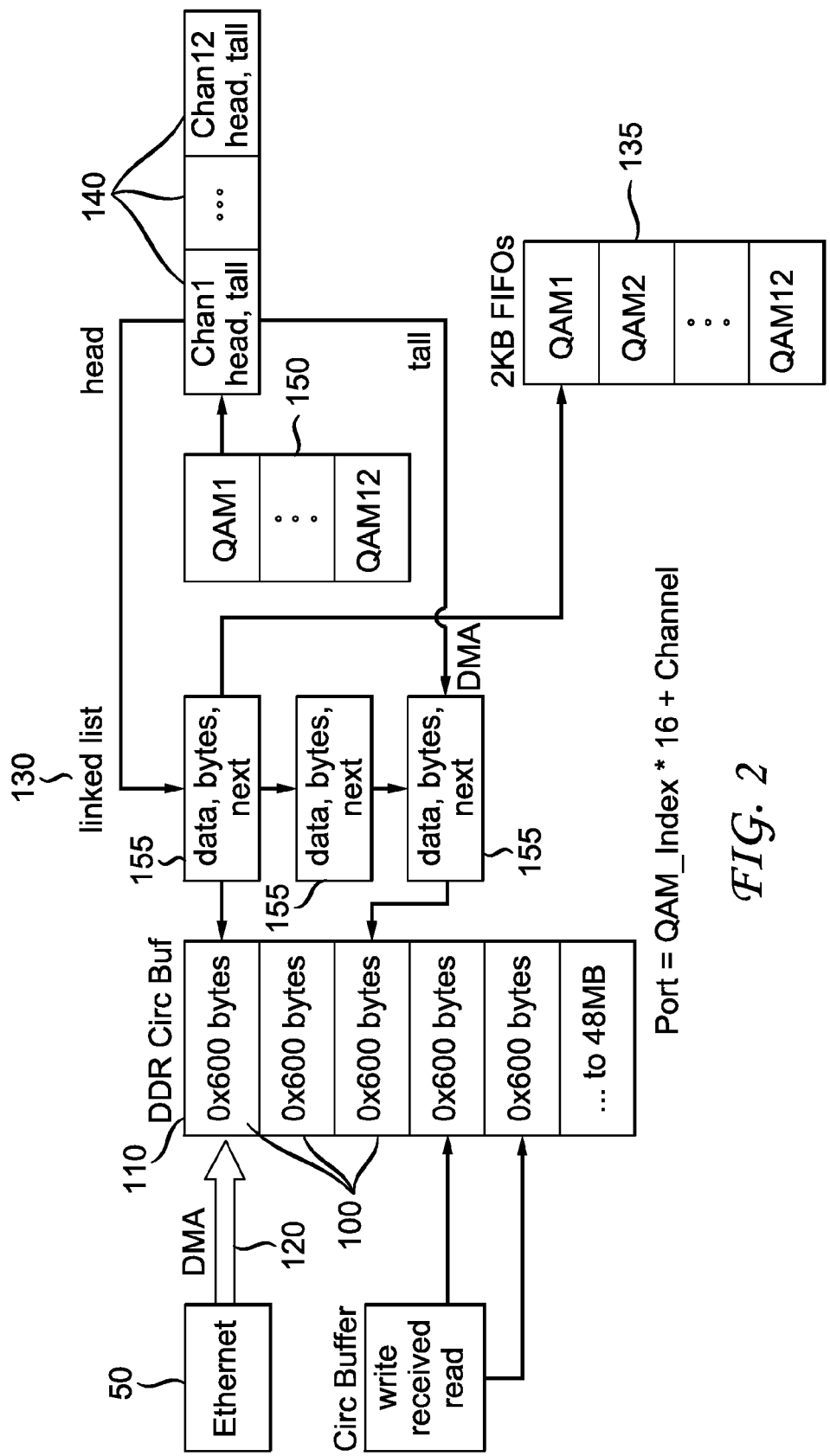
FIG. 2 is a block diagram of a modulator for distribution streams in accordance with the present invention.
Figure 3:
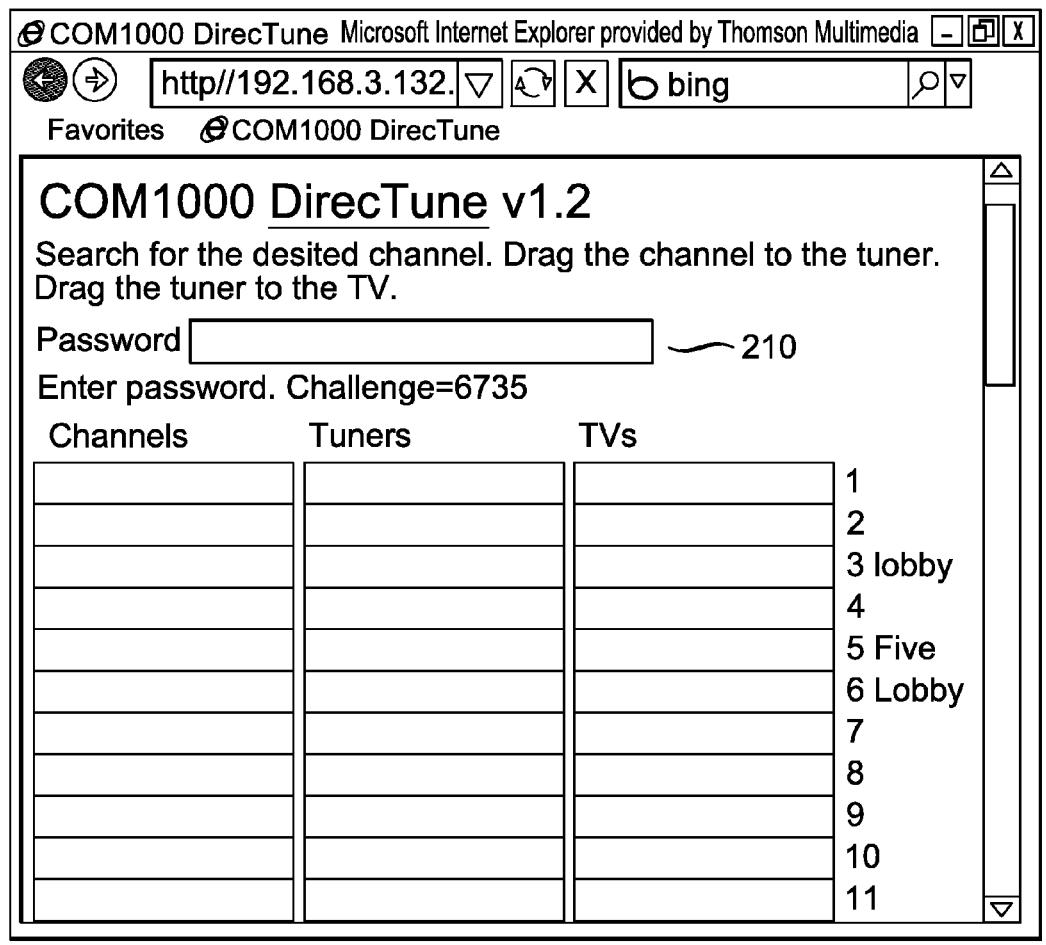
FIGS. 3-8 illustrate an exemplary user interface in accordance with the invention in which a manager of an environment can search for video content on all of the TV sets in the environment to determine what programs are playing on the various TV sets.
Figure 4:
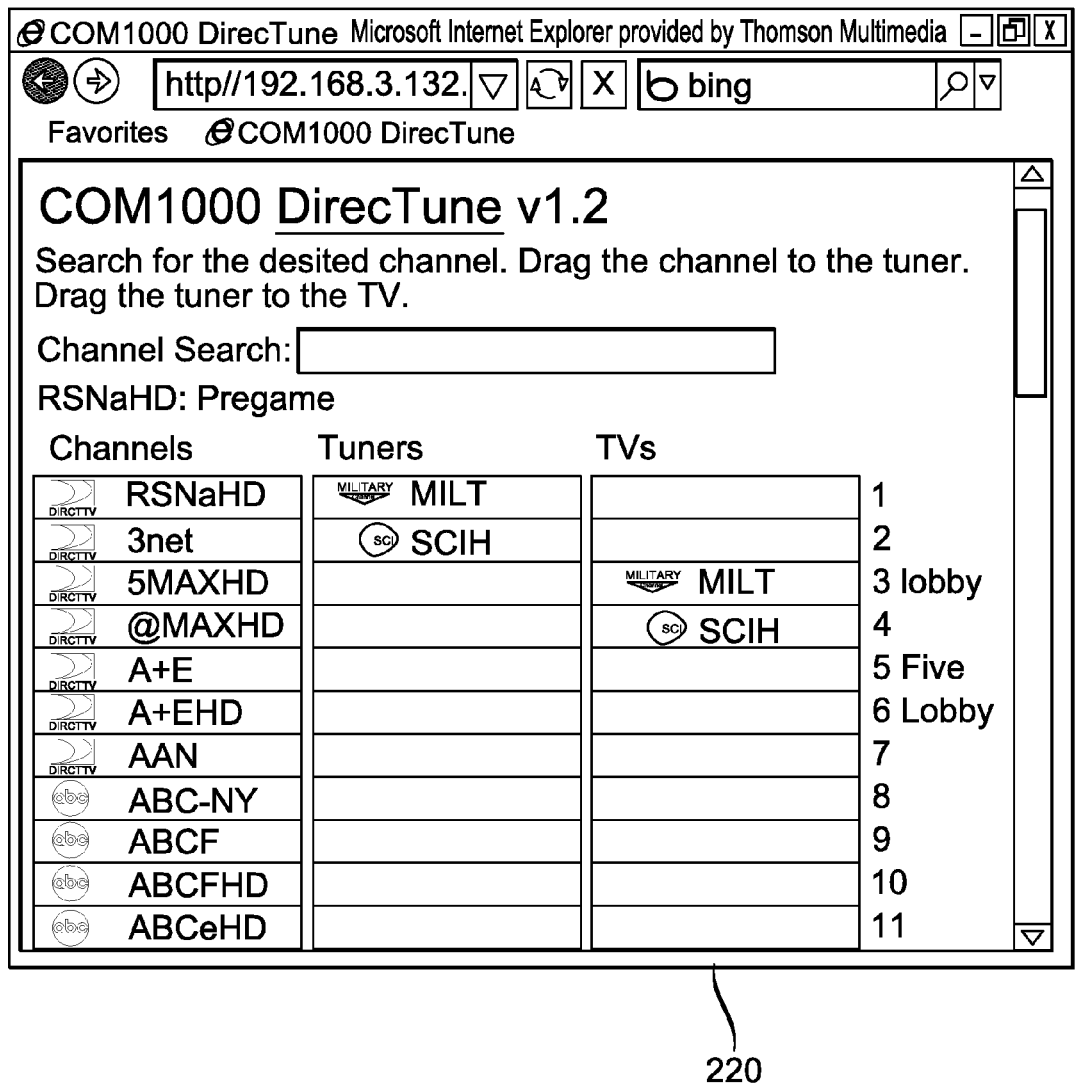
Figure 5:
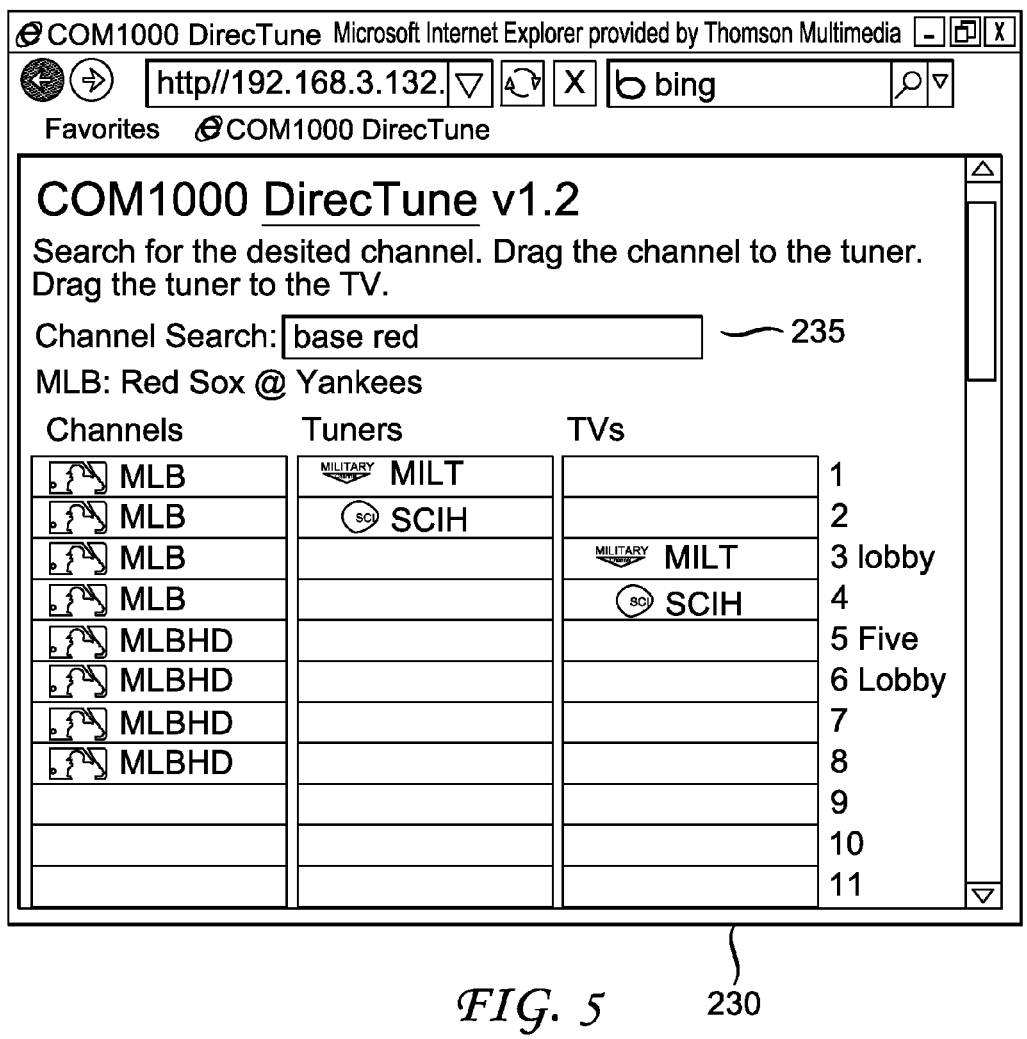

Referring to FIG. 2, the QAM modulator 60 is further described. QAM modulator 60 supports 12 QAM streams 150 with 12 video channels per QM stream. Each of the 144 video channels can have a bitrate of 20 Megabits per second (Mbps) with up to 500 milliseconds (msec) of jitter that must be buffered. If a separate first in first out (FIFO) buffer is used for each channel the memory requirements are: 144 channels*20 Mbps*0.5 seconds/8 bits per byte=180 Megabytes (MB) of buffering memory. The system only has 64 MB of double data rate (DDR) memory. Using a separate FIFO for each of the channels also requires that every transport packet be copied into the FIFO and the copied out of the FIFO.

In order to overcome these issues, the system 10 in FIG. 1 utilizes a new buffering model which reduces the amount of memory required for buffering and reduces CPU load required to move the transport packets. When the Ethernet packets are received at port 50 they are automatically placed into a single circular buffer 110 by the Ethernet DMA 120. Instead of then copying the transport packets into separate FIFOs based on the video channel, the transport packets are left in the common circular buffer 110. A small descriptor 155 is created for each group of transport packet in a User Datagram Protocol (UDP) packet. The descriptor indicates the memory location 160 and number of bytes of the transport packets in the common circular buffer 110.

Instead of moving the transport packets into a FIFO, the descriptors are placed in a linked list 130 and stored in a linked list FIFO section of list 130. This permits the common circular buffer 110 to be used for the jitter buffer for all channels 140. Since the maximum data rate of a 256 level QAM stream is 38.8 Mbps the buffer memory requirements are: 12 QAM stream*38.8 Mbps/QAM stream*0.5 seconds/8 bits per byte=29.1 MB of DDR memory. This solution also reduces how many times the transport packets must be copies since the packets do not have to be copied into separate FIFOs for each channel.

Giving the QAM modulator, such as QAM modulator 60 in FIG. 1, the ability to duplicate channels, so that a single MPEG-2 transport packet can appear at multiple QAM channel frequencies and sub-channels permits the TV to statically tuned to a fixed digital cable channel. The COM24 receiver 30 can then be commanded to tuned to a DirecTV transmitted channel and output an IP encapsulated MPEG-2 transport stream to the QAM modulator.

The input 40 to the QAM modulator 60 is a single program transport stream (SPTS) but the output of the QAM modulator is a multiple program transport stream (MPTS) that is QAM modulated. This requires program identification (PID) remapping and creating a unique Program Map Table (PMT) for each channel to define the PIDs for each channel. The QAM modulator's input UDP port directly controls which QAM channel and sub-channel is output.

Duplicating an input channel requires modifying the packet PIDs for each different output and creating a different PMT. It is preferable to use a (Direct Memory Access) DMA to transfer a packet to a QAM modulation block. After the DMA is completed, the packet is then scheduled for another DMA to a different QAM modulation block as if that packet had also been received from the Ethernet connector on a different UDP port. This permits the packets to be "chained" in the linked list 130 from one UDP input port to the next UDP input port until the input channel has been duplicated the desired number of times.

The system 10 in FIG. 1 as well as the modulator in FIG. 2 implement a process which allows multiple TV receivers to each be statically set to a channel so that remote controls need not be used to change the programs for each TV. In order to accomplish this result and implement the DMA transfers of FIG. 2, first the UDP packets containing MPEG2 transport packets are read from the Ethernet MAC by using the receive DMA engine to copy the Ethernet packets to main memory in a circular buffer. The DMA engine uses a linked list of pending DMA requests (stored in a RAM block). The pending DMA requests place the packets into a circular buffer.

All completed DMA requests are then finalized, and the size of the Ethernet packet is remembered as the counter of how many packets are in the circular buffer is incremented. New DMA requests are then added to the linked list of pending DMAs.

The central processing unit (CPU) of the QAM modulator (preferably a NIOS II CPU) analyzes the next Ethernet packet in the circular buffer to determine the packet type and place the MPEG-2 transport packets into the correct linked list by performed Address Resolution Protocol (ARP) requests for the boards Media Access Control (MAC) address to generate an ARP response. ARP reply responses let the know the Trivial File Transfer Protocol (TFTP) server's MAC address, and Ping requests generate a Ping reply. UDP packets with port 0x200 to 0x2ff are used to control the EdgeQAM operation of the QAM modulator and query its status.

The UDP packets with port QAMIndex*16+ChannelIndex contain MPEG-2 transport packets which are 188 bytes long. Up to seven MPEG-2 transport packets are in each UDP packet. The MPEG-2 transport packets are placed into linked lists. Each of the 12 QAM streams contains an array of 12 channels. Each channel has a linked list of MPEG-2 packets. There is a bit map (12 bit integer) of which QAM stream has pending packets. Within a QAM stream there is a bit map of which channels have pending packets.

The NIOS II CPU looks at which FIFOs have space available and which linked lists have data and then schedules a DMA request. There is a bit map (12 bit integer) of which FIFOs have space available. Each QAM stream is given a chance to schedule a DMA before the first QAM stream is analyzed again and within a QAM stream each channel is given a chance to schedule a DMA before the first channel is analyzed again. Looping through the QAM streams and channels prevents one QAM stream or channel from delaying the data from the other channels. The DMA requests then go into a linked list of pending DMA requests.

The content distribution system of the present invention thereby allows multiple television programs and channels to be output to multiple TV sets in an environment, thereby eliminating the need for remote controls to be used to change channels and potentially interfere with neighboring TV sets. Using the inventive QAM modulator and DMA process, the present invention permits the modulator to dynamically duplicate the output of channels, thereby allowing multiple TV sets to be statically tuned to a fixed channels. The modulator can then duplicate the output so that a single input MPEG-2 transport stream can be sent out on multiple output QAM channels and/or sub-channels to each of the desired TV sets.

A content distribution system, such as described here, allows multiple channels to be played on multiple TV sets without the need to separately tune the TV sets using a remote control, which would potentially interfere with the channels being broadcast on nearby TV sets in an environment. A modulator dynamically duplicates the output of channels, thereby allowing multiple TV sets to be statically tuned to a fixed channel and potentially to different fixed channels. The modulator can then duplicate the output so that a single input MPEG-2 transport stream can be sent out on multiple channels and/or sub-channels to each of the TV sets.

User interfaces used in conjunction with and as part of the present invention may be implemented as a HTML web page with Javascript. A known Javascript code to drag and drop boxes came has been used to develop the inventive user interfaces, and may be found at luke.breuer.com/tutorial/javascript-drag-and-drop-tutorial.aspx.

Referring now to FIGS. 3-8, an exemplary user interface is illustrated in which a manager of an environment can search for video content on all of the TV sets in the environment to determine what programs are playing on the various TV sets. When first entering the page, the user is asked for a password 210. The password can also be reset by entering a reset value that is based on the randomly generated Challenge field. After logging in, the password can be changed. At 220, an ability to poll the existing system and populate a display with known information once logged in is provided. The left column lists the channels available as filtered by the search parameter. The second column lists channels what channels are being processed by each tuner. The third column shows which channel each TV is viewing.

Preferably, the information to know what channels are currently playing is retrieved from an XML file that is available from the tuner device. The XML file may be generated using the following script:

```
<tunerList>
    <tuner>
        <chassis>8</chassis>
        <slot>3</slot>
        <index>1</index>
        <cardIp>192.168.3.132</cardIp>
        <ip>192.168.6.9</ip>
        <port>33</port>
        <streamId>0x80000004</streamId>
        <chan>1065710</chan>
    </tuner>
    ...
</tunerList>
```

Using an XML file permits the user interface to be easily replaced with a different technology such as Java, Flash, or a native executable.

A channel view of all available channels which can be accessed or viewed independently of the TV output selection is provided at 230. The Channel Search field 235 permits the user to search for channels based on the channel name, channel number, about text, channel category, or event categories. For example, entering "base red" shows channels with both "base" and "red".

The tuner server generates an XML file every five minute that lists the information necessary to display and search the channels. The web page reloads this XML file every five minutes according to the following script:

```
<channelList>
    <chan>
        <ma>13</ma>
        <mi>65535</mi>
        <n>ABC</n>
        <o>276834</o>
```

```
        <l>0</l>
        <e>Local News</e>
        <c>Local,News</c>
    </chan>
    ...
</channelList>
```

A Configurable TV view is provided at 240. View 240 provides the user interface with an ability to add more TV's per user's input or configuration and, for example, an ability to name TVs with custom names. (i.e. 1, 2, 3 or Bar, Lobby, Front Desk). The names of the TVs can be changed by entering a number followed by an equal sign followed by the name. For example, here TV #2 is changed to "Bob". Additionally, this feature allows a split screen showing TV view and channel view on a single page.

Figure 7:
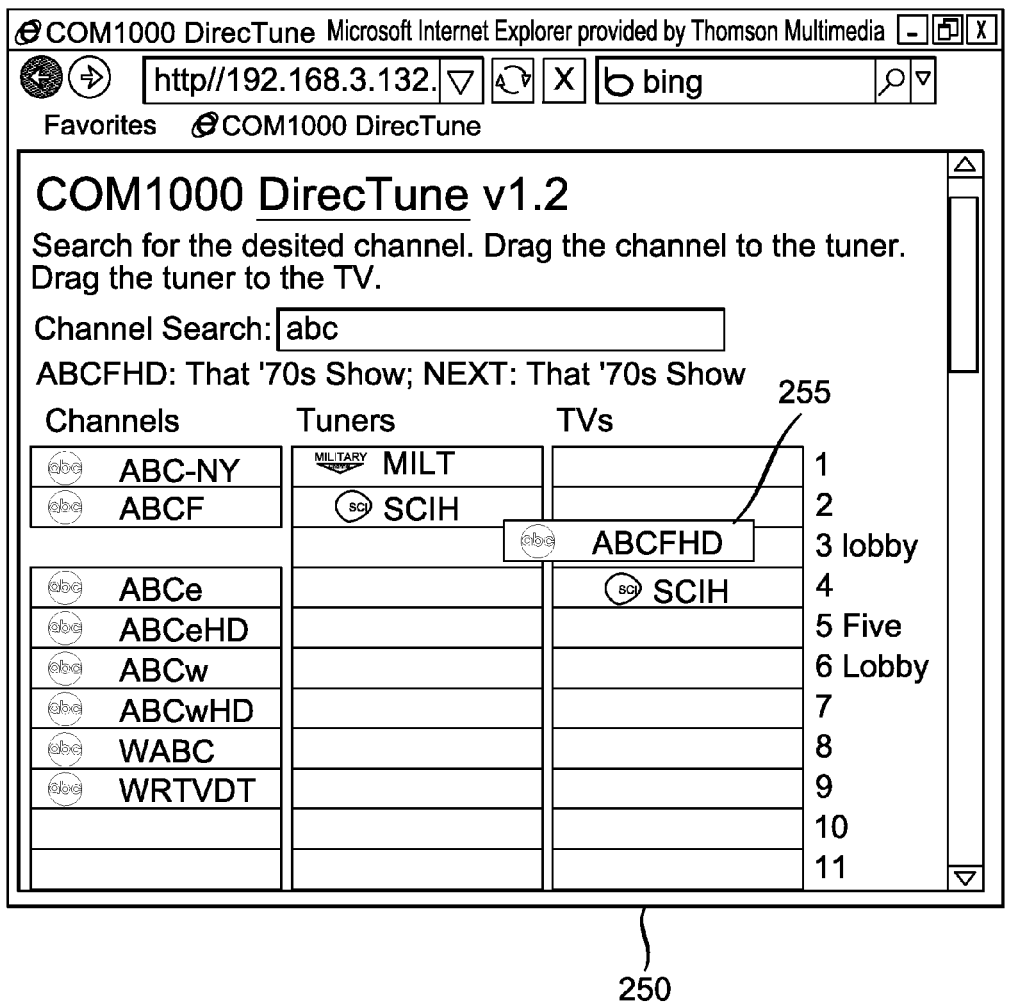

It is preferable to provide a drag and drop functionality 250 so that the manager can drag a desired channel from channel view and place it on a desired TV in TV view. FIG. 7 illustrates this functionality at 255 wherein the channel ABCFHD is being dragged to TV #3.

Figure 8:
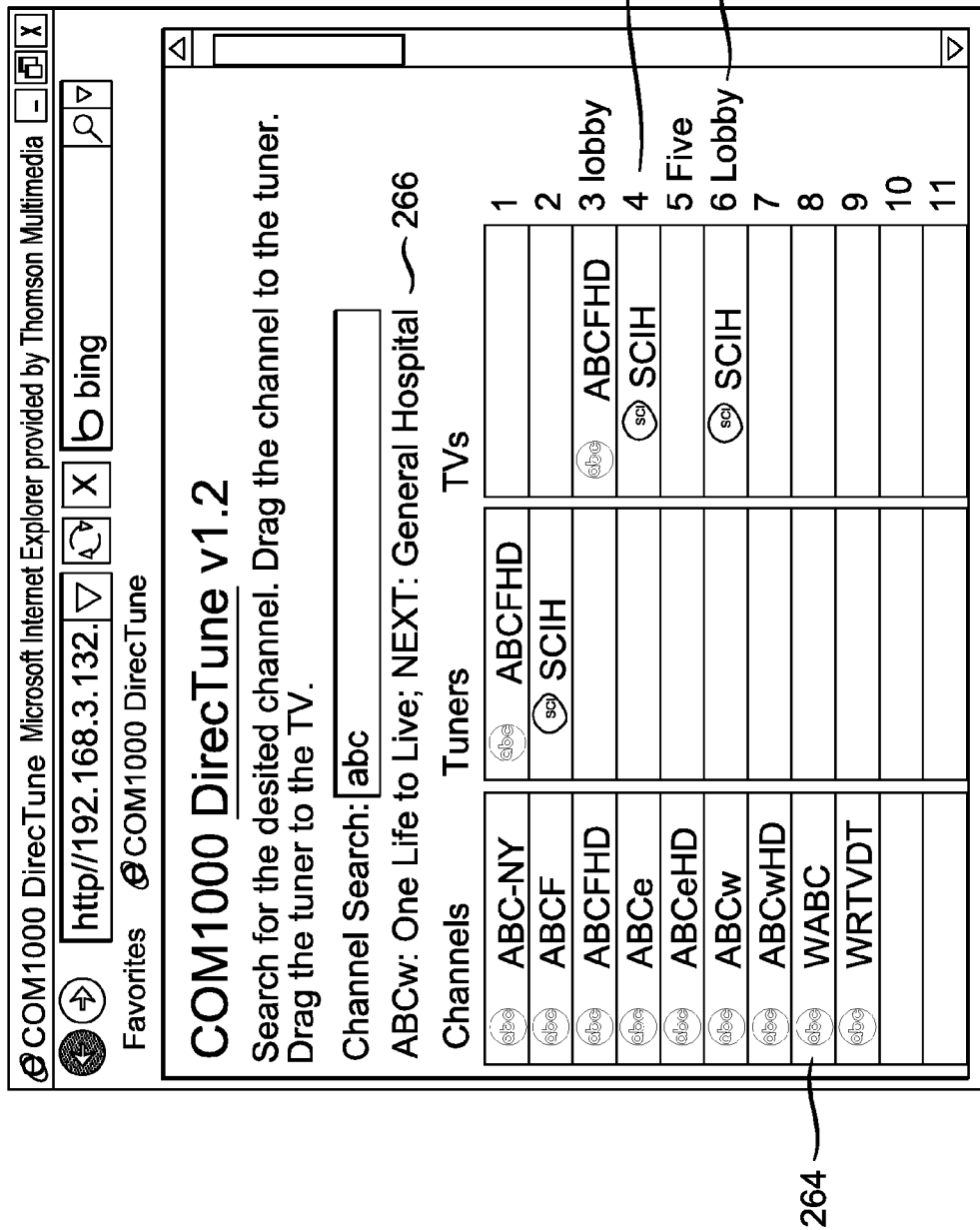

Support for as many different channels playing through the TV output as the number of tuners available in the COM1000 system is provided by the inventive interface at 260. FIG. 8 shows that the SCIHD channel 162 has been dragged and dropped to TV #6 so that both TV #4 and TV #6 are both displaying the SCIHD channel. Display of 'On-now' information for all channels is shown in the channel view. The interface also allows for adding a scheduler function which would list all channels and show guide information in a standard guide table.

Figure 6:
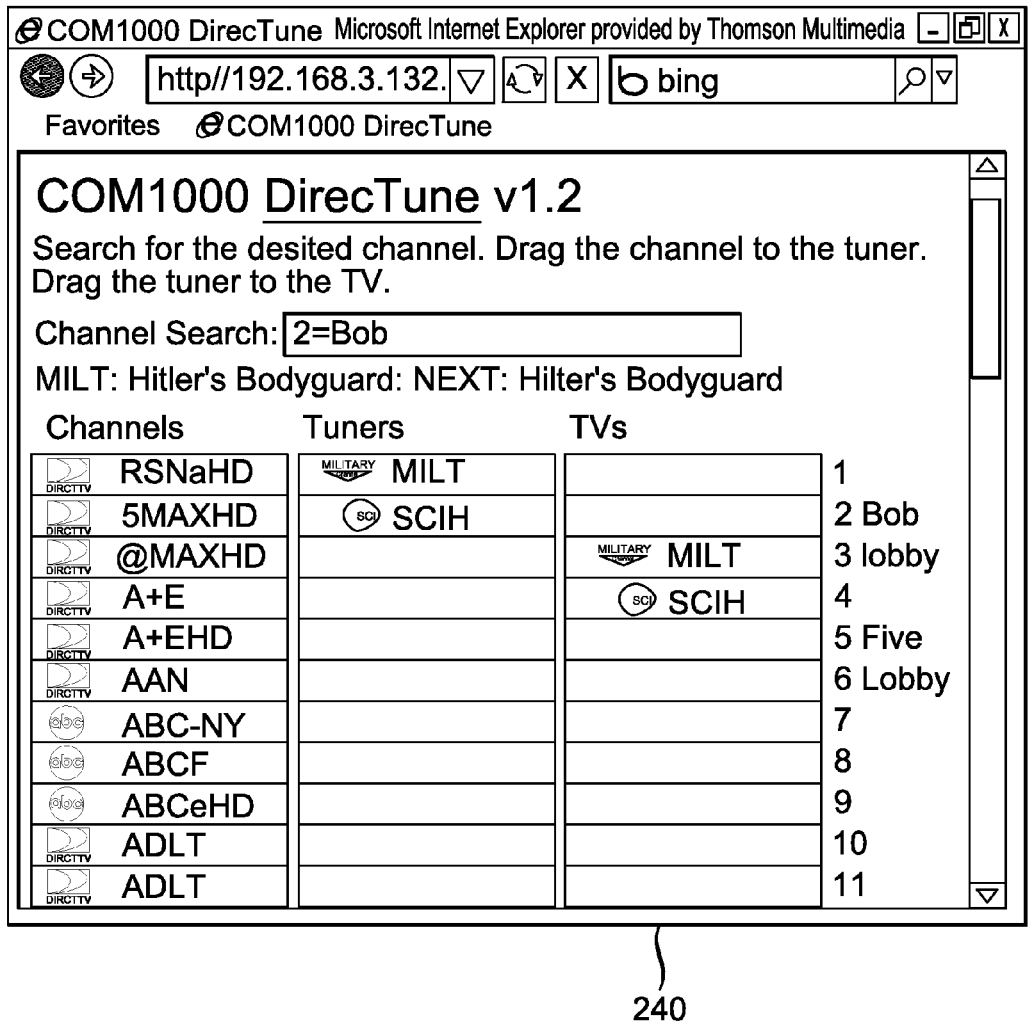

In FIG. 6, the mouse was over the ABCw channel 264. The current program event and the next program event 266 are shown above the list of channels. In this case the program currently playing on ABCw is "One Live to Live".

It is preferable to provide an automated refresh command which will be sent to all DIRECTUNE interfaces currently logged into a content distribution system based on any tuning request made. Moreover, the channels.xml and tuners.xml files are reloaded every five minutes. The directune.html file is stored in a location that is user upgradeable so that the user can modify the user interface and load an updated version back to the COM24 card. The the referenced Appendix containing the Directune2.txt file illustrates an embodiment of software code used for implementing one or more aspects of the present disclosure the code is an example of a preferred embodiment of an HTML script which implements the DIRECTUNE functionality of the inventive user interface:

FIG. 9 illustrates another exemplary user interface combining many of the aspects illustrated in FIGS. 3-8 and using aspects further described in FIGS. 1 and 2. FIG. 9 further permits operation in a more visual drag and drop operating environment, showing televisions in use on the left and available channels on the right. Any channel may be selected and dragged to any one or more of the TVs shown on the left.

The description in FIGS. 1 and 2 above describe a multichannel distribution control system operating in a first mode. In the first default mode, the outputs for the modulators are controlled with the TV devices remaining tuned to a fixed channel. However, additional operating modes may be possible and may be used in conjunction with, or instead of, the first mode. In a second mode, the IP streams are controlled rather than the channels. And in a third mode, the TV channeling is addressable, allowing further channel mapping flexibility.

Figure 10:
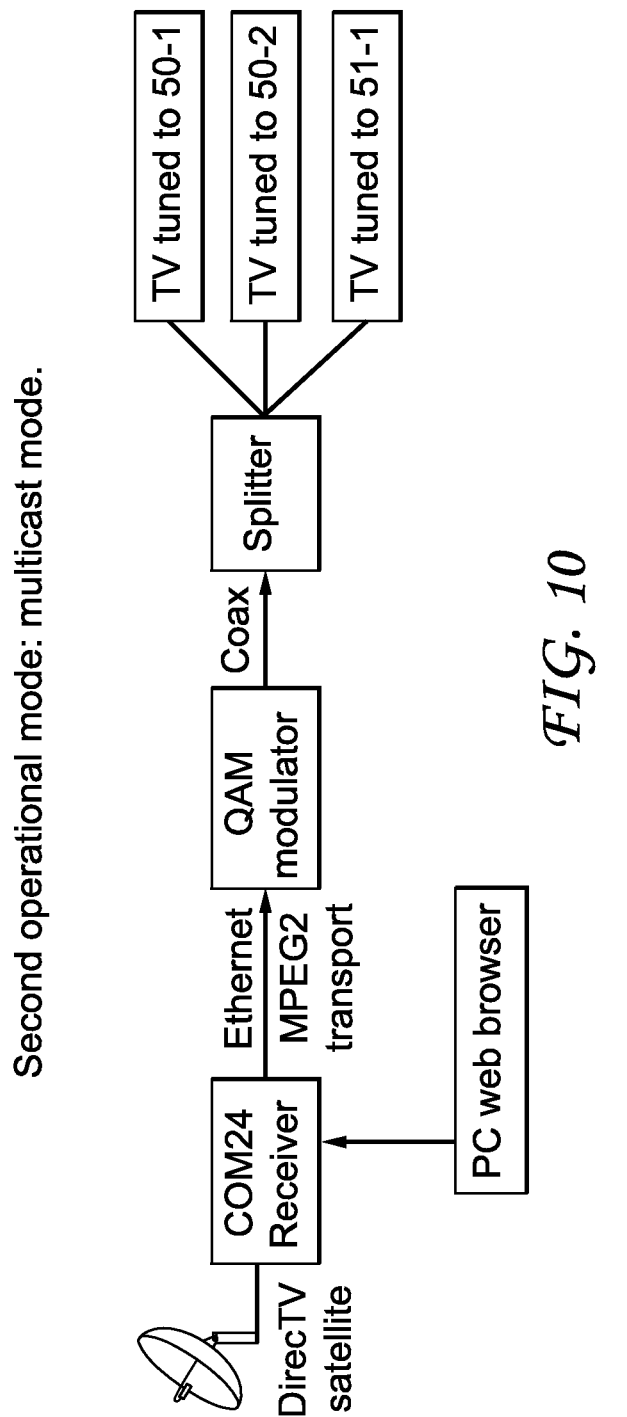
FIG. 10 illustrates the media server architecture again wherein the system can be operated in multiple transmission modes.

Specifically, the first default mode focuses primarily on conventional RF signal transmission and using physical QAM channels to deliver media content. However, certain configurations of the signal distribution systems, such as may be found in casinos or multi-room facilities, may benefit from other operating modes, including addressable control and Internet Protocol multicasting. FIG. 10 illustrates the basic system using either IP based or addressable QAM equipment present in the bar, casino, or multi-room facility.

The normal use case for the multicast mode is that the user has a remote control that permits him to switch between the multicast streams. MediaTune will be used to define what channels are playing on these multicast streams.

If MediaTune (MT) is in multicast mode the IP address or UDP port tuners of any tuners would not be changed. Each TV in the MediaTune UI on the left instead references a tuner. The only thing to be changed would be the channel that that tuner is tuned to. If the user requests that multiple tuners tune to the same channel this is acceptable, but it may be desired to optionally let the user know that he has just done this, but not to prevent it.

In the TUNERS.XML file, if the output IP has any addresses in the range specified below, this would be a Multicast or IP installation. Rather than tying the TVs to a port number as is presently done, the TVs would show a list of the "TUNERS" with a label for each showing the IP address of the output or even a label (channel 1, channel 2, channel 3, etc. . . . ).

MT as it is today shows output (QAM port numbers) and leaves the tuners unexposed. Multicast MT would need to show all the tuners rather than output. There would be no duplication of channels or joining stream IDs, just simply showing the status of each tuner. It may be useful to read a critical file, such as the TUNERS.XML file, then auto populate the screen to show the status of each.

The mode detection is based on identifying if a multicast is being used:

Multicast if:

224.0.0.0<=ip && ip<=239.255.255.255

If the majority of tuners are sending to a Multicast address then MediaTune is in multicast mode. Otherwise it is in the default mode.

Finally, the user interface remains similar to user interface describe earlier in FIGS. 3-9. One receiver may be assigned per multicast stream. So rather than listing TV's, a list of each stream and what channel is playing on each stream is shown.

The third operating mode, the addressable QAM channels mode, is most useful in conjunction with the use of a set top or set back converter box, such as the DCI401MCS. This converter box is often used with some (older) television sets that may not be capable of receiving QAM signals directly.

The DCI401 has a QAM tuner input, a user remote control, HDMI output, and channel 3/4 output.

If the customer has a DCI401 receiver connected to every TV, it is possible to control what QAM channel each DCI401 is watching. Each DCI401 has a unique Receiver Identifier (RID) that should be known. There is no limit to the number of TVs since each TV represents a DCI401. There also is not a need to have the QAM24 do channel duplication with the Stream_ID. If a particular DCI401 has a RID of 12345678 then COM24 is used tell the particular DCI401 to tune to:

http://192.168.3.132/cgi-bin/webcmd?screen=Command401&MessageType=5&rid=12345678&majorNum=18&minorNum=2&text=&tftpIp=192.168.1.254-.

In sequence, the DCI401 message tunes to a QAM channel. For instance, the DCI401 should be instructed to tune to channel 18-2 because it is known that Science (channel 284 on the satellite network) is playing out on port 34 (mapped to the QAM as RF 18, slot 2). As a result, the DCI401 tunes to 18-2 while the COM24 head end tunes to 284 and outputs on QAM 18-2.

If the channel is to be changed to a program stream which is not playing already, the COM24 channel may be changed, 284 to 206 for instance, but still streaming out on port 34, leaving the DCI401 on the same channel. Tuners will be tied to QAM channels, then control messages get sent to the DCI401 to either switch to a different QAM channel or to change the satellite service playing out its married QAM channel.

"MessageType=5" means tune to a channel. In the case of a tune request the "text=" and "thp=192.168.1.254" parts of the URL are required but ignored. This type of command can also have the COM24 send a software update to the DCI401 and to get the software image from the indicated TFTP IP address.

The basic user interface remains similar to one described above in FIGS. 3-9, now with each TV/converter box (DCI401) identified by a RID.

Aspects described herein relate to a method and apparatus for QAM modulator channel distribution having a plurality of modes. The content distribution system of the present invention allows multiple television programs and channels to be output to multiple TV sets in an environment, thereby elimination the need for remote controls to be used to change channels and potentially interfere with neighboring TV sets. The present invention permits a modulator to dynamically duplicate the output of channels, thereby allowing multiple TV sets to be statically tuned to fixed channels. The modulator can then duplicate the output so that a single input MPEG-2 transport stream can be sent out on multiple channels and sub-channels to each of the desired TV sets.

Further, a user interface for a content distribution system is disclosed that allows a manager of an environment of TV sets to view which content is playing on individual TV sets, and to change, track and otherwise adjust the content. The invention advantageously provides these features without interfering with other TV sets' programming when another TV set is being adjusted, changes or tracked by the manager.

Still further, a content distribution system having additional operating modes for a plurality of signal distribution options is disclosed that may be possible and may be used in conjunction with, or instead of, the mode described above. While the above mode focuses primarily on conventional RF signal transmission and using physical QAM channels to deliver media content, certain configurations of the signal distribution systems, such as may be found in casinos or multi-room facilities, may benefit from other operating modes, including addressable control and Internet Protocol multicasting. In a second mode, the IP streams are controlled rather than the channels. And in a third mode, the TV channeling is addressable, allowing further channel mapping flexibility There have thus been described certain preferred embodiments of systems, devices, and user interfaces for content distribution systems provided in accordance with the present invention. While preferred embodiments have been described and disclosed, it will be appreciated by those with skill in the art that modification are within the true spirit and scope of the present invention.

The invention claimed is:

1. Content distribution system comprising:
   a modulator for dynamically duplicating output of multiple channels, thereby causing the modulator to output a single transport stream having multiple transport packets at multiple frequencies to allow for static tuning of the multiple channels;
   a plurality of receivers which each can be individually tuned to one of the multiple channels, wherein the single transport stream can be sent on the multiple channels to desired ones of the plurality of receivers and wherein the distribution can occur in multiple modes;
   a user interface which allows a manager of the content distribution system to dynamically change the channels on each receiver with the user interface so that each of the receivers can be statically tuned to one of the multiple channels through the user interface; and
   wherein the modulator duplicates the output of multiple channels by receiving the single transport stream in Ethernet UDP packets from a tuner and by placing the received Ethernet UDP packets into a single circular buffer, and a descriptor in a UDP packet is created indicating a memory location and number of transport packets of the single transport stream in the single circular buffer.

2. The content distribution system of claim 1, wherein the single transport stream is in a format of one of an MPEG-2 datastream, an MPEG-4 datastream, a DVB datastream, an ARIB datastream, an ATSC datastream, an IP datastream, an IP multicast datastream, and an addressable channel controller datastream.

3. The content distribution system of claim 2, wherein the user interface employs a drag and drop mode.

4. The content distribution system of claim 3, wherein the user interface comprises a two part visual display having monitors depicted on a first side, and television channels depicted on a second side.

5. The content distribution system of claim 2, wherein the system is operated in a first mode comprising fixed channels for each receiver and wherein the fixed channels are each statically tuned to each receiver.

6. The content distribution system of claim 2, wherein the system is operated in a second mode comprising IP streams.

7. The content distribution system of claim 2, wherein the system is operated in a third mode comprising addressable channels.

8. A method of tuning receivers in a content distribution system comprising the steps of:
   dynamically duplicating output of multiple channels received in a single transport stream, thereby outputting the single transport stream having multiple transport packets at multiple frequencies to allow for static tuning of the multiple channels;
   tuning to one of the multiple channels, wherein the single transport stream can be sent on the multiple channels and wherein the distribution can occur in multiple modes; and
   dynamically changing the channels with a user interface so that each of the multiple channels can be statically tuned according to a command input through the user interface; and
   wherein the dynamically duplicating further comprising receiving the single transport stream in Ethernet UDP packets from a tuner and by placing the received Ethernet UDP packets into a single circular buffer, and a memory location and a descriptor in a UDP packet is created indicating a memory location and number of transport packets of the single transport stream in the single circular buffer.

9. The method of claim 8, wherein the single transport stream is in a format of one of an MPEG-2 datastream, an MPEG-4 datastream, a DVB datastream, an ARIB datastream, an ATSC datastream, an IP datastream, an IP multicast datastream, and an addressable channel controller datastream.

10. The method of claim 9, wherein the user interface employs a drag and drop mode.

11. The method of claim 10, wherein the user interface comprises a two part visual display having monitors depicted on a first side, and television channels depicted on a second side.

12. The method of claim 9, wherein the system is operated in a first mode comprising fixed, statically tuned channels for each receiver.

13. The method of claim 9, wherein the system is operated in a second mode comprising IP streams.

14. The method of claim 9, wherein the system is operated in a third mode comprising addressable channels.

\* \* \* \* \*